Figure 1:
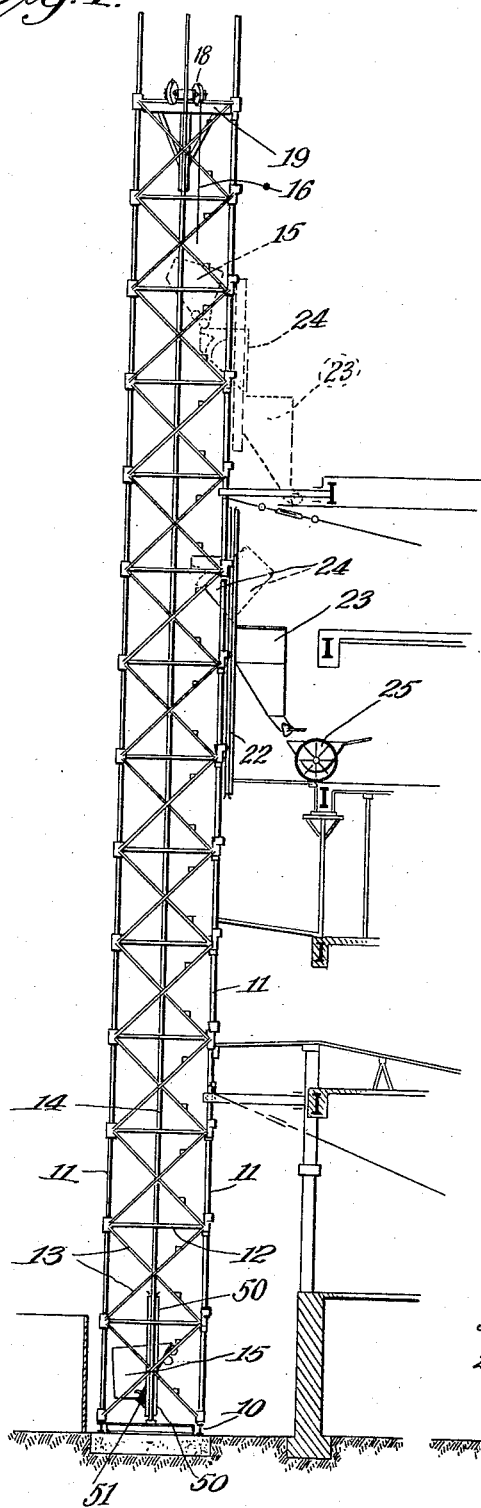

April 12, 1932. A. T. SCANNELL 1,853,085
TOWER FOR ELEVATING CONSTRUCTION MATERIALS
Filed March 11, 1929 7 Sheets-Sheet 1

Inventor
Albert T Scannell

April 12, 1932. A. T. SCANNELL 1,853,085
TOWER FOR ELEVATING CONSTRUCTION MATERIALS
Filed March 11, 1929    7 Sheets-Sheet 2
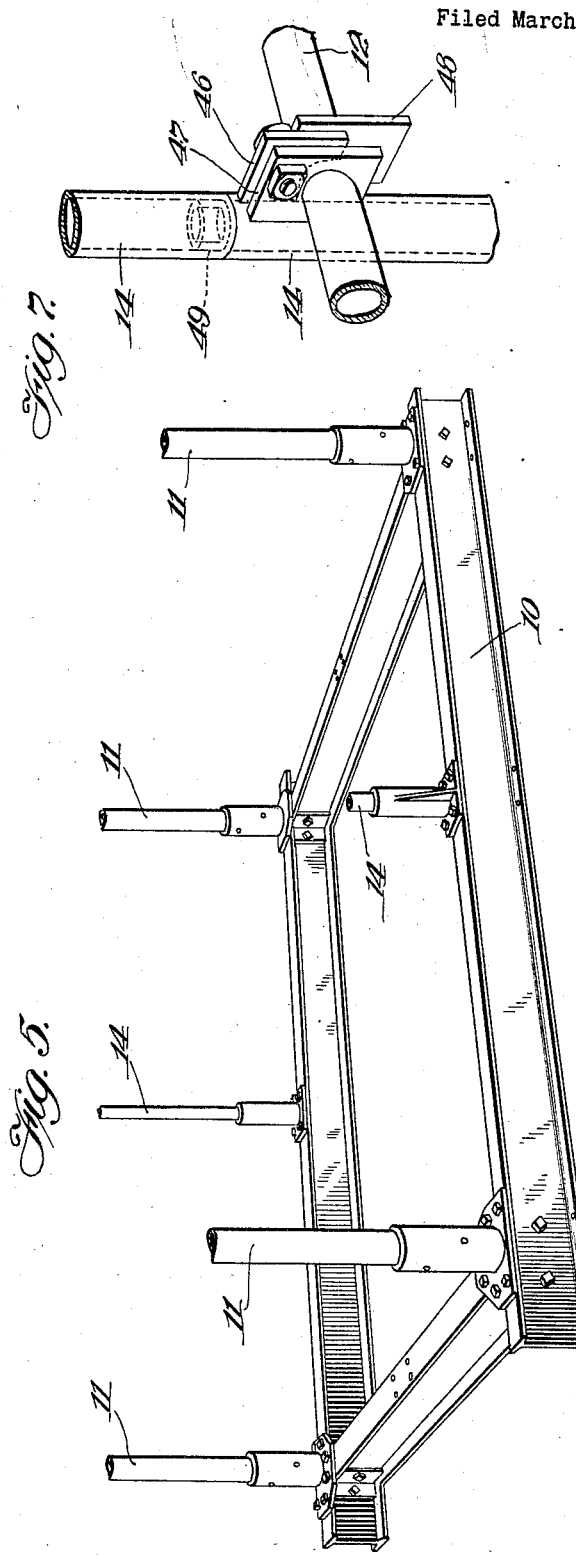
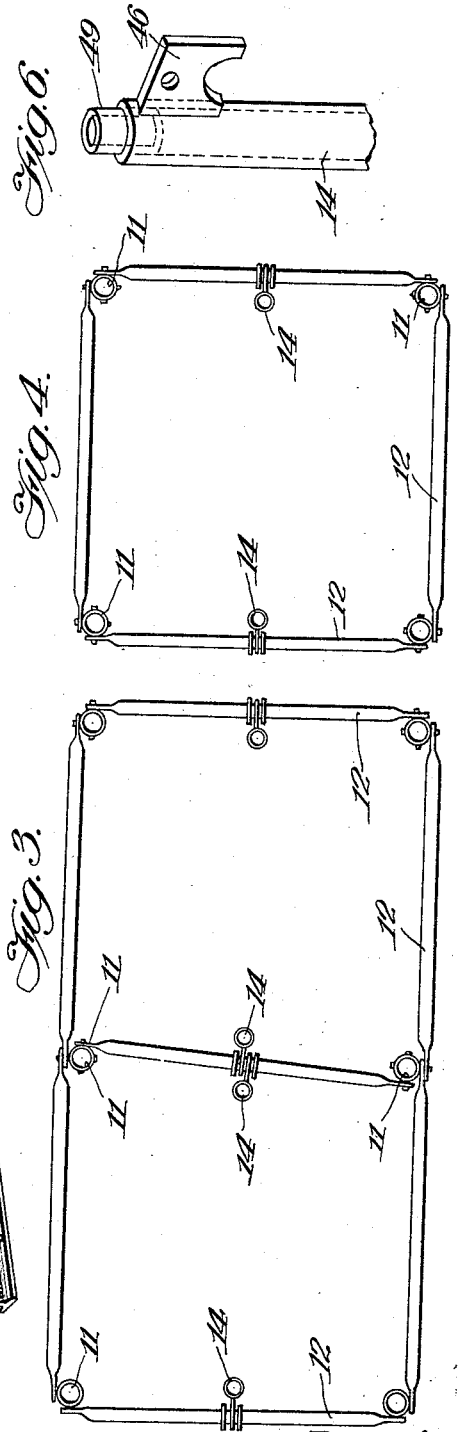
Inventor
Albert T. Scannell
By George Bayard Jones
Attys.

April 12, 1932.  A. T. SCANNELL  1,853,085
TOWER FOR ELEVATING CONSTRUCTION MATERIALS
Filed March 11, 1929   7 Sheets-Sheet 3
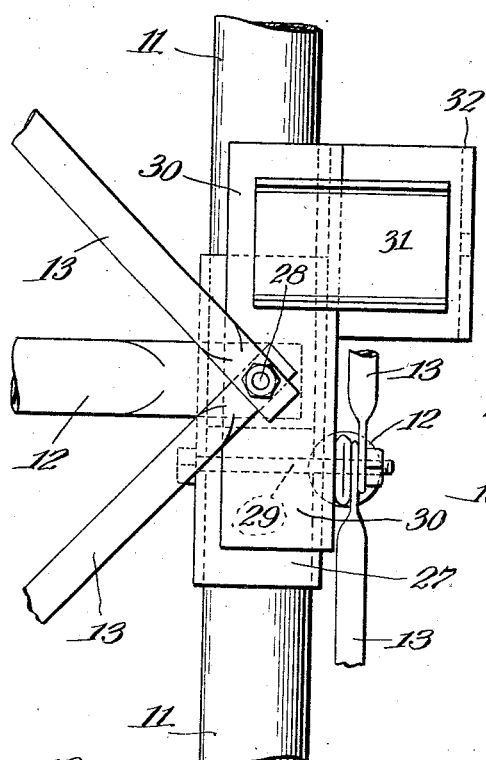
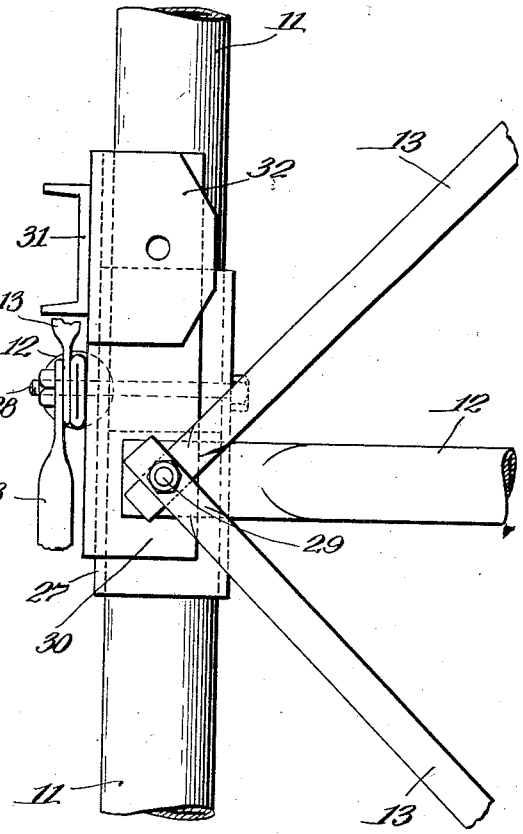
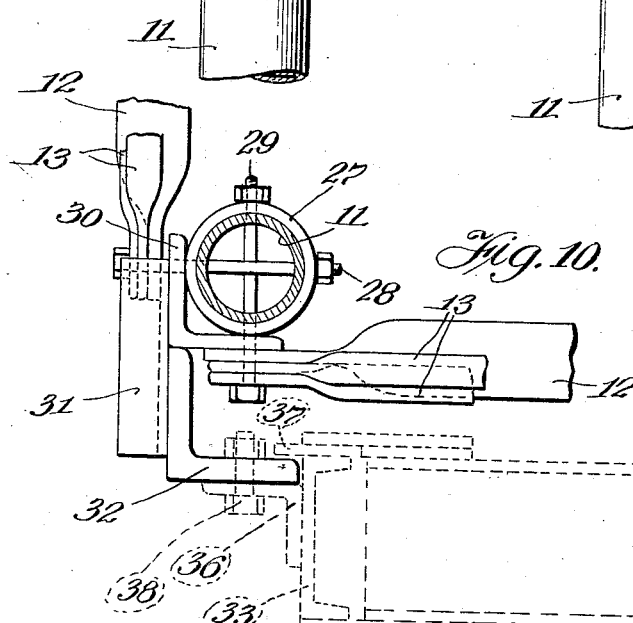
Inventor:
Albert T. Scannell
By George Bayard Jr.
Attys.

April 12, 1932.　　　A. T. SCANNELL　　　1,853,085
TOWER FOR ELEVATING CONSTRUCTION MATERIALS
Filed March 11, 1929　　7 Sheets-Sheet 4
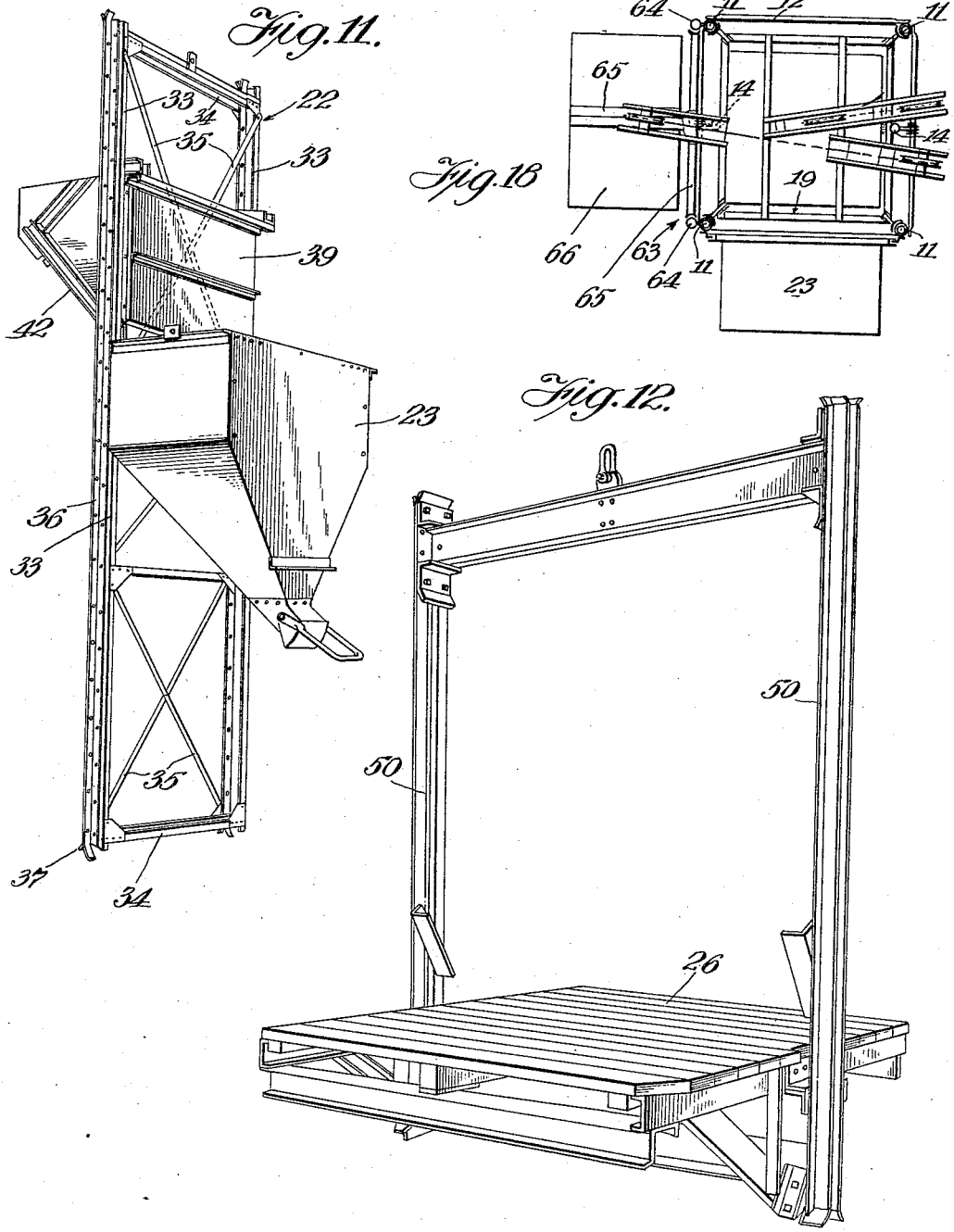

April 12, 1932. A. T. SCANNELL 1,853,085
TOWER FOR ELEVATING CONSTRUCTION MATERIALS
Filed March 11, 1929 7 Sheets-Sheet 5
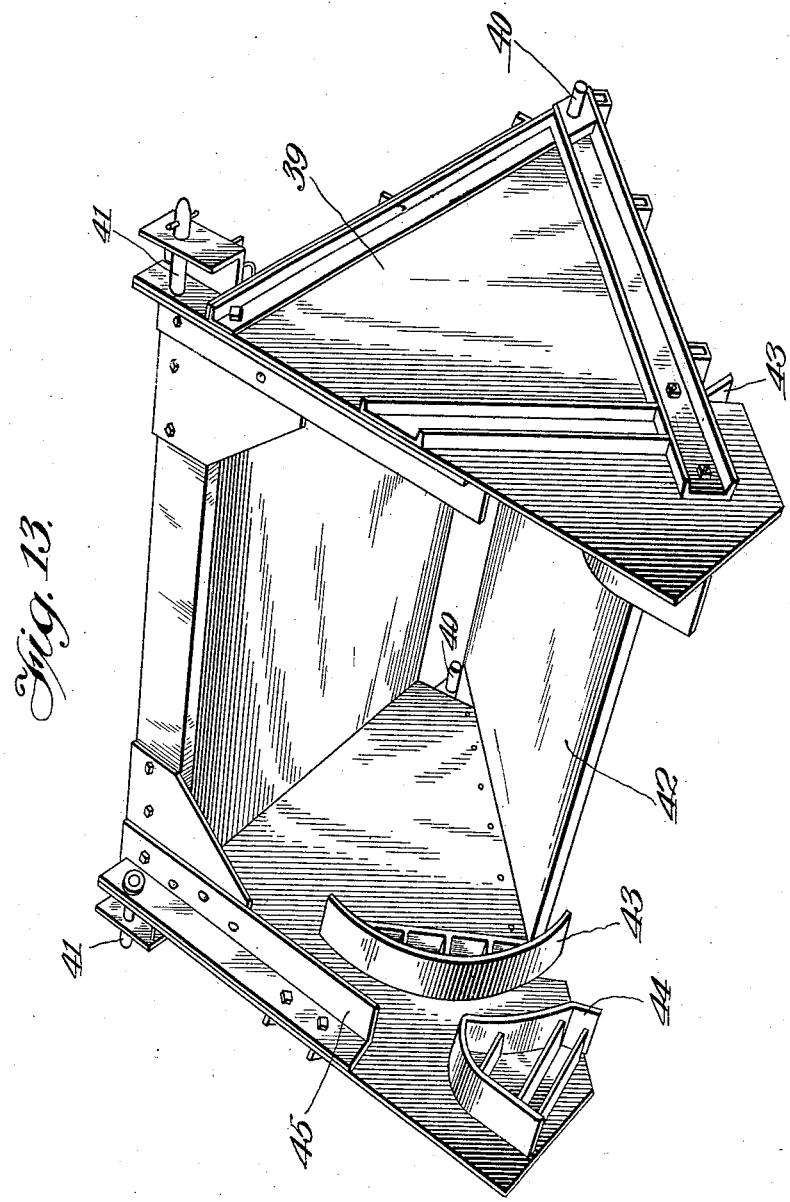
Inventor
Albert T. Scannell
By
Attys.

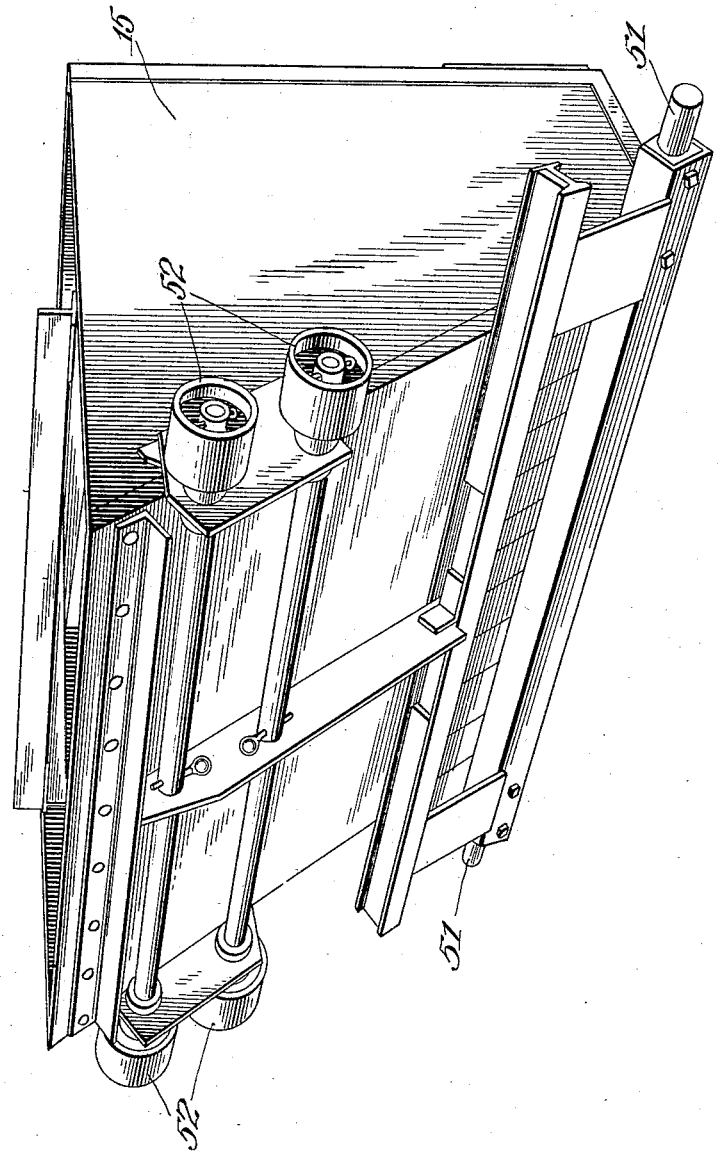

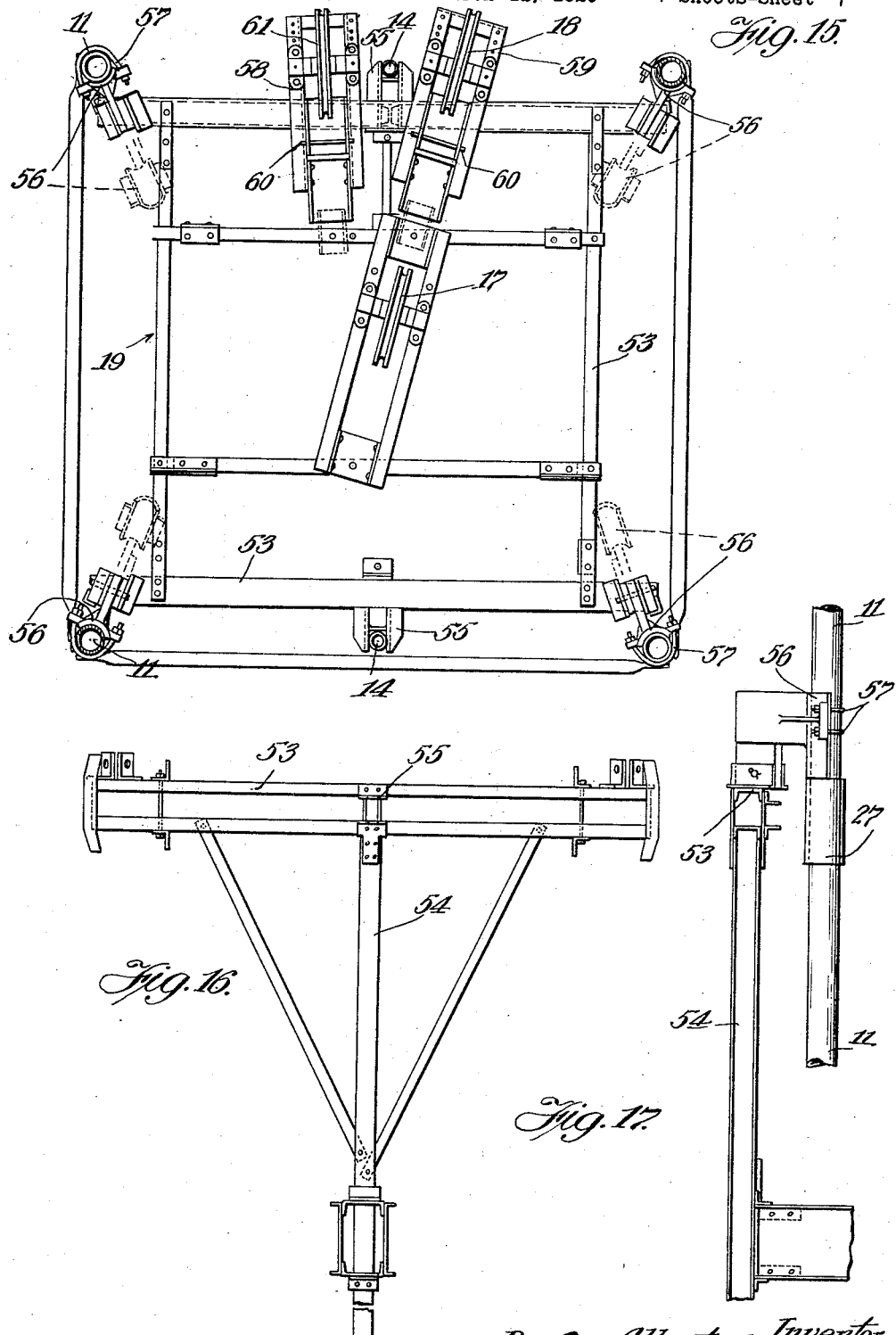

Patented Apr. 12, 1932

1,853,085

UNITED STATES PATENT OFFICE

ALBERT T. SCANNELL, OF CHICAGO, ILLINOIS

TOWER FOR ELEVATING CONSTRUCTION MATERIALS

Application filed March 11, 1929. Serial No. 345,963.

My invention relates to improvements in towers for elevating construction materials.

The commercial embodiment of the invention illustrated in the drawings is of the type known as a sectional pipe tower in that the vertical corner members are made of short lengths of pipe arranged end to end in vertical alignment and having horizontal girts and diagonal bracing also made of pipe, the sections thus formed being strong, light, and the parts thereof being readily fitted together, whereby a tower may be erected fairly rapidly and after being used may be taken apart and reassembled in a new location.

Many of the improvements described herein are applicable to construction towers in general, regardless of the cross section of the vertical compression members, that is, they may be used in connection with a wooden tower, a steel tower built up of angle iron, channels, I beam sections or other sections and of any suitable material.

The objects of the invention are; to provide a light, strong tower, the parts of which may be quickly elevated and fitted to the preceding sections; to provide a tower having a track or vertical guides for the dump bucket or the material platform made in sections which may be readily secured to the tower sections and fitted together in vertical alignment; to provide a series of short members, secured to the outside of the tower and arranged in vertical alignment to form, in effect, a special vertical track whereby the hopper frame may be secured thereto and raised from time to time as necessary but without requiring a continuous track, thereby eliminating this expense; to provide a cat-head arranged to slide vertically inside the tower whereby the labor and expense of raising said cat-head from time to time is greatly reduced; to provide a single well tower having a cat-head vertically adjustable inside the tower, a concrete bucket operating inside the tower and a material elevator operating outside the tower whereby a single tower may perform the function of a double tower. Various other objects and advantages will be apparent from the following description of the embodiment of the invention illustrated in the accompanying drawings, certain features of which are claimed in a divisional application 417,364, filed December 30, 1929, and in a divisional application 462,861, filed June 21, 1930, which issued March 31, 1931, as Patent 1,798,501.

Figure 2:
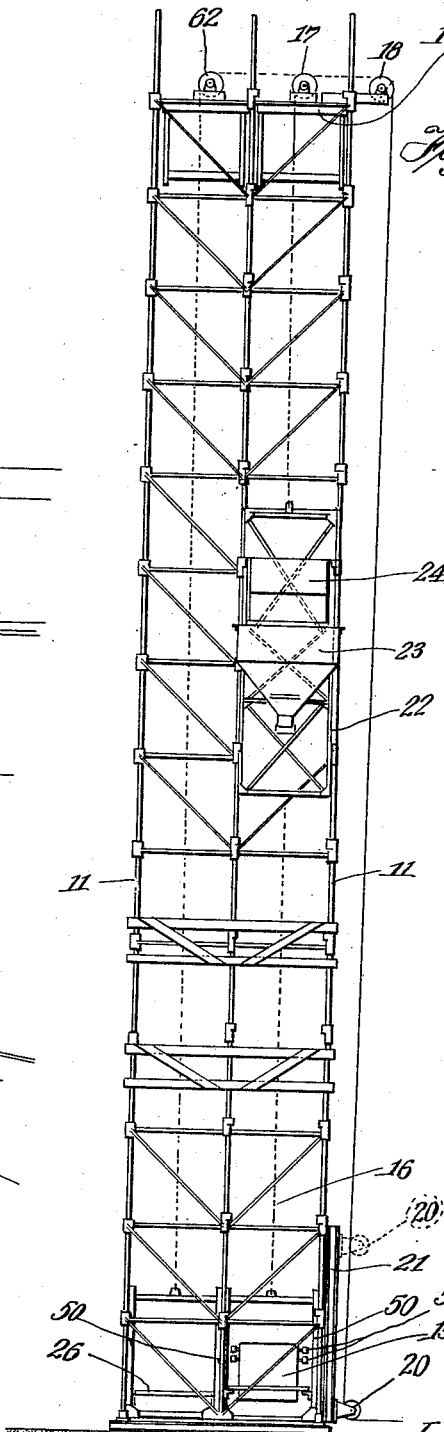

In the drawings:

Fig. 1 is a side elevation of a double tower, although it may serve also to illustrate a single tower, Fig. 2 is a front elevation of a double tower, Fig. 3 is a top plan view thereof, Fig. 4 is a top plan view of a single tower, Fig. 5 is a perspective view of the base, Fig. 6 is a perspective view of one of the tubular track sections, Fig. 7 is a perspective view of two aligned sections and the supporting horizontal girt, Fig. 8 is an enlarged side view of two aligned corner posts and associated parts, Fig. 9 is a front view thereof, Fig. 10 is a top plan view thereof, Fig. 11 is a perspective view of the hopper frame and parts carried thereby, Fig 12 is a perspective view of the material elevator, Fig. 13 is a perspective view of the pivoted chute, which is associated with the hopper, Fig. 14 is a perspective view of the concrete hoist bucket, Fig. 15 is a top plan view of the cat-head, Fig. 16 is an elevation of the cat-head frame, Fig. 17 is a side view of part of the same; and Fig. 18 is a plan view of a modified form of tower.

Where a single tower is to be erected, a base 10 is provided for supporting the tubular corner posts 11, of which there are four, the lower ends of said posts or pipe lengths being received within suitable corner sockets as shown. Where a double tower comprising four corner posts and two intermediate posts is to be erected, the rectangular base is made proportionately longer.

The individual corner posts may be of any desired length, experience having shown that a length of six feet six inches, is a convenient one.

The corner posts are connected at or near their ends by horizontal girts 12 and diagonal bracing 13, all of which is preferably of tubular form, i. e. consisting of tubes flattened at the ends and bolted to the upright members, as hereinafter described.

Within the tower is a vertical track consisting of a pair of tubular members 14, (see Figs. 1, 4 and 5) one on each side of the tower, and where a double tower is erected, such a track is provided in each well (see Fig. 3). The concrete bucket 15 is arranged to slide up and down on the track in what may be called the concrete hoisting well, in a double tower. A material elevator, hereinafter referred to, slides up and down on the track in what may be called the construction material hoisting well.

A cable 16 is attached to the bucket frame and extends upwardly, passing over sheaves 17, 18 on a cat-head 19, said cable passing downwardly and under another sheave 20 on a sheave frame 21, bolted to the bottom of the tower.

A hopper frame 22 is arranged to slide up and down on what is called the front face of the tower which is the side thereof facing the building under construction, and is bolted thereto, except when being raised to successively higher positions. It carries a hopper 23 fixed thereto and, in the form shown, also has a chute 24 pivoted thereto above the hopper and arranged to extend into the tower, the hopper being on the outside thereof. The arrangement is such that the dump bucket 15 dumps concrete into the chute 24, from which it flows into the hopper 23 and thence is delivered into carts 25, or to chutes, or is otherwise distributed.

A construction material platform 26 is arranged to slide vertically in the other of the two wells. In fact the frame which carries the concrete dump bucket is designed to have a platform substituted for the dump bucket after the concrete work is finished so as to provide a second construction material platform as hereinafter explained.

The corner posts are connected, in vertical alignment, and are braced, as shown in Figs. 8 and 9. Each tubular corner post 11, as well as the two intermediate posts, in the case of a double tower, has a tubular member or sleeve 27 fitted over an end thereof, preferably the upper end, and projecting beyond the same to form a socket for the lower end of the pipe length above it. This tubular sleeve is bolted to the lower of the two adjacent pipe lengths by bolt 28 and is bolted to the upper of the two by a bolt 29. These bolts also pass through the flattened ends of the tubular diagonal braces 13.

In Fig. 2 there are three vertically aligned series of tubular posts on the side of the double tower facing the building. The two right hand series have means thereon constituting an interrupted track on which the hopper frame may slide. These additional members are shown also in Figs. 8 and 9 and may comprise short lengths of angle irons 30 secured to the pipes 11 by any approved means, as for example, by the same two bolts 28 and 29 which pass also through the horizontal girts and diagonal braces. In the construction illustrated, each angle iron 30 has a channel 31 welded thereto which supports a short length of angle iron 32 in spaced relation to the tower, although other track sections and means for spacing the same from the face of the tower may be employed. The outer flanges of these angle irons constitute the guide or interrupted track and have openings therein to permit the hopper frame to be bolted thereto. These flanges are arranged in vertical alignment and the hopper frame is preferably long enough to overlie at least three of them at a time, whereby they serve as a track as well as supporting brackets for said hopper frame when the latter is bolted in any position of vertical adjustment.

The hopper frame is shown in Fig. 11 and consists preferably of vertical channel members 33 and transverse channel members 34 together with diagonal braces 35. The latter are important, as some of the diagonal bracing of the tower is removed when the equipment is in use with the hopper frame in fixed position. This diagonal bracing on the hopper frame serves, in effect, to replace the diagonal bracing removed. In other words, the hopper frame stiffens the tower.

The channel frame has angle irons 36 secured thereto with a series of aligned openings therein to enable said frame to be bolted to the tower. These angle irons together with the adjacent parallel bars 37, (see Fig. 10) constitute the guides which slide on the angle irons 32 previously referred to. Bolts 38 secure the angle irons 36 to the angle iron 32 as shown also in Fig. 10.

When it is necessary to raise the hopper, a cable is secured to the top thereof and, passing over a suitable sheave at the top of the tower, is operated by power or a block and tackle are used.

The hopper 23 is secured to the hopper frame 22 as is also the pivoted chute 39 (see Fig. 13) said chute having a rod 40 passing therethrough, the ends of which constitute the pivotal support. Locking pins 41 serve to retain the chute in the normal position shown in Fig. 11. In this figure it will be understood that said chute projects through the face of the tower into the interior thereof, the diagonal bracing of the tower being removed at this point. The diagonal bracing 35 of the hopper frame passes through the chute, thus limiting the pivotal movement of the latter. When it is necessary to raise the frame, the hopper and the chute, the latter is swung rearwardly about its pivotal support to a point outside of the tower face so as not to strike the diagonal bracing of the tower and horizontal girts, during the elevation of this equipment. When the chute is thus tipped back, the inclined wall 42 engages the diagonal bracing 35 and limits the rearward movement. The hopper has guide members 43, 44 and 45 thereon constituting a track for engaging certain rollers on the bucket, to dump the latter as it is travelling upwardly past said chute, as hereinafter explained.

The construction of the vertical track for the dump bucket frame will now be described. Each section 14, as shown in Figs. 6 and 7, consists of a pipe having a notched plate 46 welded thereto at its upper end, which plate may be hooked over the horizontal girt 12 to support said pipe. Said horizontal girt has plates 47, 48 welded thereto, one of which projects preferably a little higher than the other, said other projecting a little lower than the first one and said plates being spaced apart far enough to receive the plate 46 between them. These fixed plates prevent lateral movement of the pipe sections 14 and insure vertical alignment thereof, even though each pipe section is supported at one point only. The staggered arrangement of the plates 47 and 48 make it easy to lower the notched plate 46 between them, regardless of the manner in which the horizontal girt is bolted in place; for example, it is immaterial if the end to end arrangement of said girt is reversed, as in either position one of the fixed plates projects above the other. Each tube 14 has an insert 49 therein, either a short length of pipe or a solid plug which projects therefrom and serves to lock the adjacent pipe lengths together. As shown in Fig. 7, the notched plate may be bolted between the adjacent fixed plates, at intervals, to prevent the pipe sections 14 from lifting, in case the elevator guides should stick to them for any reason.

The dump bucket frame 50 in Figs. 1 and 2 is identical with the frame shown in Fig. 12, which latter serves to support a material platform. In other words, the same frame may be used for either purpose. In fact, in either a single or a double well tower, after the concrete has been poured, the dump bucket is removed and a material platform substituted in the frame.

When said frame supports the dump bucket 15, the latter is pivoted thereto about the rod 51 as shown in Figs. 1 and 2, the rollers 52 engaging the guides 43, 44 and 45 on the pivoted chute shown in Fig. 13, as the bucket moves upwardly past it, in a manner which is well understood. The bucket dumps entirely within the tower, that is, as it turns up side down, it clears the inner sides of the tower, whereas dump buckets used heretofore inside of a tower have been arranged to strike fixed brackets or guides on the tower, the bucket, as it inverts, swinging upwardly beyond the plane of the tower to dump into a hopper outside of the tower.

By the arrangement provided herein, the concrete is conveyed from the bucket within the tower to the hopper without the tower by the pivoted chute which passes through the plane of one face of the tower as previously described. While a tilting dump bucket is preferred, many of the advantages of the arrangement described may be retained by using a bottom dump bucket.

The cables for raising and lowering the dump bucket pass over sheaves supported by the cat-head 19. The cat-head consists of a suitable horizontal frame 53 with vertical members 54 secured thereto and having guides 55 thereon which slide on the same tubular tracks 14 which furnish the guides for the dump bucket. The cat-head proper is smaller than the cross section of the tower and may thus slide up and down within the same. When in use, the cat head is fastened to the tower by hinged brackets 56, each hinged to the cat-head frame near one of the corner posts as shown in Fig. 15. Each bracket is provided with openings through which a pair of U bolts 57 may pass to clamp the bracket to one of the vertical corner posts 11. As shown in Fig. 17, these brackets have a semi-circular extension which, with the U bolts, surround the corner posts and rests on the enlarged sleeve 27, thus positively supporting the cat-head on these four abutments. Pivoted frames 58 and 59 are also provided which may swing in or out about their hinged connections 60 so that the sheaves carried thereby will project outwardly beyond the face of the tower. One of said frames carries the sheave 18 which is in line with the sheave 17 over which the cable passes to the dump bucket and the other frame 58 supports a sheave 61 over which the cable passes to a second sheave 62 at the top of the material hoisting well whereby the material platform may be elevated (see Fig. 1). This platform 26 is shown in Fig. 12 associated with the sliding frame 50 previously described. It is also shown in Fig. 2.

The cat-head is usually located near the top of the tower, as shown in Fig. 1, with four corner posts 11 projecting above it. When it is desired to raise said cat-head, the tower is built up four or five sections higher and a sheave, on a suitable frame, is positioned at the top of the tower to enable the cat-head frame to be raised by a cable or a rope passing over the sheave. After the cat-head is bolted in its new position, the cables for the concrete bucket and material elevator are repositioned over the sheaves and the tower is again in condition for use after a comparatively short delay as compared with the delays previously experienced.

A modified and preferred form of tower is shown in Fig. 18 and consists of a single tower 63 which may be constructed in the same way as those previously described herein, the same reference characters being used to indicate the corner posts, diagonal braces, etc. The concrete bucket frame 50 slides up and down on the tracks 14 in the manner previously described and discharges concrete through a hopper 23 as before. On another face of the tower an additional track 64 is provided on which travels a sliding frame 65 carrying a material elevator 66. With the concrete bucket (which may be transformed into a second material elevator) on the inside of the tower and a material elevator on the outside of the tower, the necessity for a second tower is dispensed with and a substantial economy effected.

The same cat-head previously described is, of course, arranged in the tower near the top thereof, whereby the concrete elevator and the material elevator may be raised and lowered.

To facilitate climbing the tower, suitable steps 67 are secured to the diagonal bracing, being made preferably of metal straps bent to triangular form.

What I claim is:

1. A sectional tower having a member secured to each section of substantially less length than the section, said members being arranged in vertical alinement and a suitable frame of a length to span at least two of said members and having means for slidably engaging the same whereby said frame may be moved vertically on said members as a track.

2. A sectional tower having a member secured to each section of substantially less length than the section and having a flange thereon, said flanges being arranged in vertical alinement to form an interrupted track and a slidable frame of a length sufficient to span at least two of said flanges and interlocking with said members whereby said frame may be moved vertically on said members but is restrained against movement toward or away from said tower.

3. A construction tower comprising vertical supporting members having vertical guides positioned inside the same and supported thereby, means slidable on said guides for the elevation of materials, a cat-head also slidable on said guides and located above said means and a cable depending from said cat-head to said means, to operate the latter.

4. A sectional tower comprising vertical posts having complemental ends fitting together, a short vertical track member secured to each of two corresponding ends of two of said posts on the same side of said tower, the track members on superimposed sections being aligned to form an interrupted track, and a frame spanning at least two pairs of said track members and slidable thereon.

5. A sectional tower comprising vertical posts having complemental ends fitting together, a short vertical track member secured to each of two corresponding ends of two of said posts on the same side of said tower, the track members on superimposed sections being aligned to form an interrupted track, a frame spanning at least two pairs of said track members and detachably secured thereto whereby it may be adjusted vertically, and a hopper on said frame.

6. A sectional tower comprising vertical tubular members for each section with a sleeve surrounding one end of each member and projecting beyond the same to form a socket which receives the end of the corresponding, aligned tubular member of the adjacent section, and a track member secured to each of a plurality of said sleeves, the track members of one section aligning with the track members of the remaining sections.

7. A sectional tower comprising vertical tubular members for each section with a sleeve surrounding one end of each member and projecting beyond the same to form a socket which receives the end of the corresponding, aligned tubular member of the adjacent section, a track member secured to each of a plurality of said sleeves, the track members of one section aligning with the track members of the remaining sections, a hopper frame vertically slidable on said track members, and members for securing it thereto.

8. A sectional tower comprising vertical tubular members for each section with a sleeve surrounding one end of each member and projecting beyond the same to form a socket which receives the end of the corresponding, aligned tubular member of the adjacent section, horizontal members secured to each of a pair of said sleeves, flanges on said members extending toward each other to form a track spaced from the face of said tower, and a hopper frame slidable on said track.

9. A construction tower comprising a plurality of vertical members connected by horizontal girts to form a well open from top to bottom, and a plurality of track members each having a hook at the top thereof to connect it with one of said horizontal girts, the upper end of each track member fitting the lower end of the one above it whereby the two are locked against relative side movement.

10. A construction tower comprising a plurality of vertical members connected by horizontal girts to form a well open from top to bottom, a plurality of track members each having a hook adjacent the top thereof to connect it with one of said horizontal girts, the upper end of each track member fitting the lower end of the one above it whereby the two are locked against relative side movement and a pair of stops secured to each of said horizontal girts on opposite sides of said hooks to maintain the vertical alinement of said track members.

11. In a sectional tower a transverse member for each section, a vertical track member for each section of substantially the same length as said section and having complemental ends whereby the upper end of one track member may interlock with the lower end of the track member above it, each track member having also means for securing it to the same corresponding point on any one of said transverse members whereby a continuous vertical, sectional track may be assembled on said tower with each section of said track secured thereto at one point only.

12. A tower comprising sections each having a horizontal girt at the top thereof, a vertical track member for each section of substantially the same length as said section and having complemental ends whereby the upper end of one track member fits the lower end of the one above it and prevents relative lateral movement, each track member having a projection thereon to engage the corresponding horizontal girt and support said member, and means on said girt to prevent lateral movement of said member whereby the upper end of each of said track members is positioned directly with reference to said girt and the lower end is positioned indirectly by the corresponding girt of the section below it, thus insuring vertical alinement of said track.

13. A sectional tower having horizontal girts and having track members each with a notched plate projecting from it to fit over a girt, each track member having a projection at one end and a recess at the other whereby said track members may be fitted together in vertical alinement.

14. A construction tower comprising vertical members connected by horizontal girts, certain of said girts being reversible and having two plates secured thereto, offset from each other vertically and spaced apart, and tracks comprising sections each having a plate projecting therefrom to fit between a pair of said first plates and guided into the recess between them by the higher of said two plates, in either of the two positions of said reversible girt.

15. A tower comprising a plurality of tubular members connected by tubular horizontal girts, certain of said girts being reversible and each having a pair of spaced plates welded thereto, one of said plates of each pair projecting above said girt beyond the other and one of said plates projecting below said girt beyond the other, tubular tracks each having a notched plate welded thereto to fit one of said reversible girts between said spaced plates and having a cylindrical member projecting from one end thereof for engagement with an adjacent track section.

16. A sectional tower having horizontal girts and vertical track lengths each having an apertured supporting member resting on one of said girts, an abutment on each girt having an aperture in line with the aperture in said member and a bolt passing through said apertures to position said track length.

17. A double tower having horizontal girts therein, a tubular track on each side of said girts having hooked flanges which rest on said girts and are arranged diagonally with respect to the main axis of said tower to position each track opposite the other.

In testimony whereof I have subscribed my name.

ALBERT T. SCANNELL.